United States Patent [19]

Palermo

[11] Patent Number: 5,709,105
[45] Date of Patent: Jan. 20, 1998

[54] BEVERAGE CONTAINER COOLER ADAPTED FOR USE WITH A STANDARD CUP HOLDER

[76] Inventor: Ralph Palermo, 2260 10th St. N., Naples, Fla. 33940

[21] Appl. No.: 577,927

[22] Filed: Dec. 22, 1995

[51] Int. Cl.⁶ ........................................ F25D 3/08
[52] U.S. Cl. ........................ 62/457.4; 62/371; 220/739
[58] Field of Search ...................... 62/457.4, 457.5, 62/457.3, 371, 529, 530; 220/426, 635, 739, 737

[56] References Cited

U.S. PATENT DOCUMENTS

| | | | |
|---|---|---|---|
| 4,344,303 | 8/1982 | Kelly, Jr. | 62/457.4 |
| 4,882,914 | 11/1989 | Haines-Keeley et al. | 62/457.4 |
| 4,974,741 | 12/1990 | Gustafson et al. | 220/739 |
| 5,022,549 | 6/1991 | Beaver | 220/739 |

*Primary Examiner*—John M. Sollecito
*Attorney, Agent, or Firm*—M. K. Silverman

[57] ABSTRACT

A beverage container cooler proportioned for use in a standard cup holder, comprising a rigid tube having a hollow, an open upper end and a closed lower end, and an interior and exterior, and insulation covering the exterior of the upper end.

5 Claims, 1 Drawing Sheet

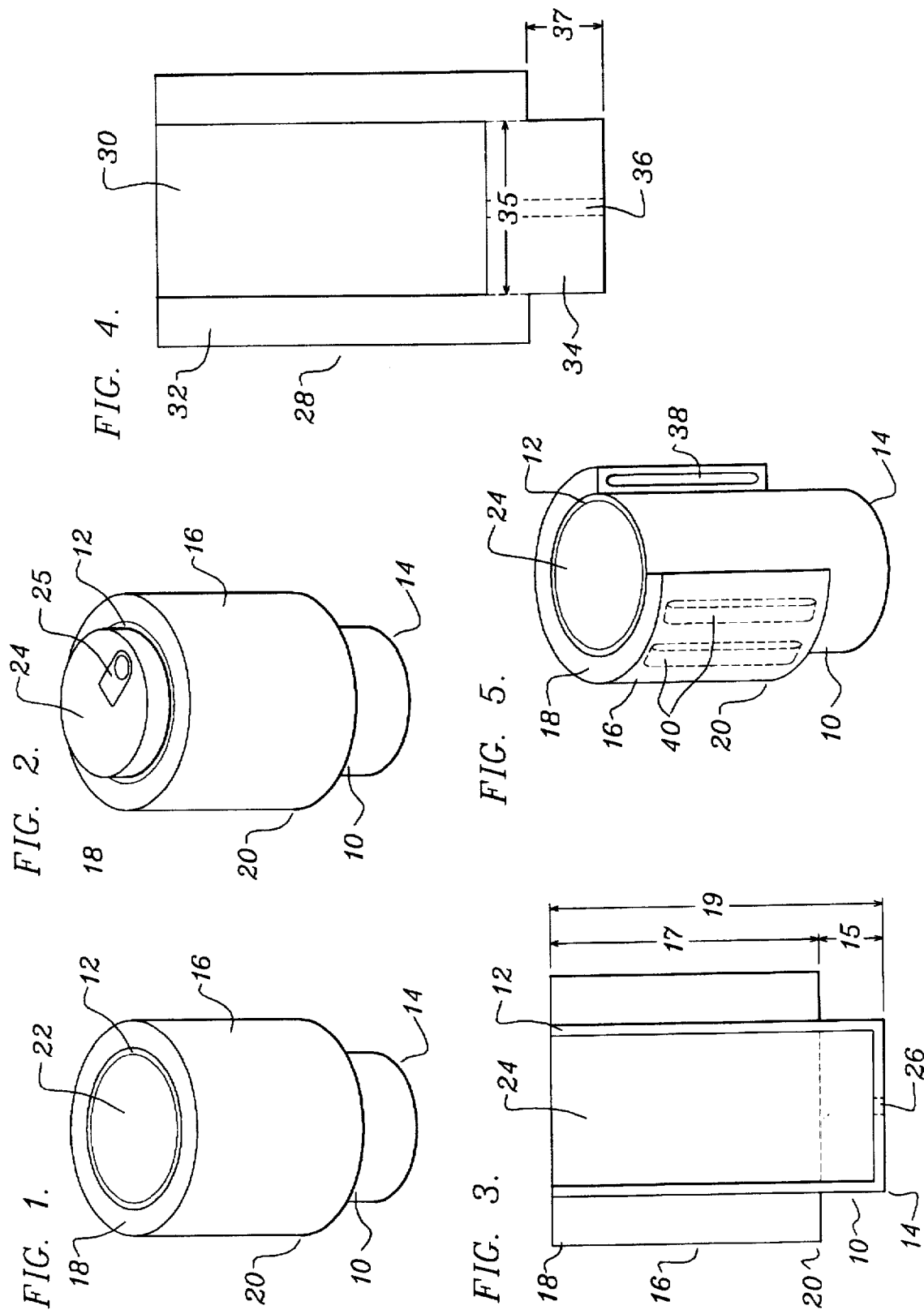

BEVERAGE CONTAINER COOLER ADAPTED FOR USE WITH A STANDARD CUP HOLDER

BACKGROUND OF THE INVENTION

1. Field of the Invention

The present invention relates to a beverage container cooler which is adapted for use in a standard cup holder. More particularly, the present invention relates to a beverage container cooler which has insulation about its upper portion, and has little or no insulation about its lower portion so that the lower portion may securely fit into a standard cup holder, such as is present in automobiles and boats.

2. Description of the Related Art

There are several articles which insulate an individual beverage container, especially beverage containers such as aluminum cans and glass bottles. The insulating articles either consist of a tube of insulation, open at one end, which the beverage container fits into, or the insulating article may be a "wrap," which is in essence an insulatory blanket which has attaching means at its edges and secures about the body of the beverage container. However, these articles do not fit within a standard cup holder, which is typically 2½ to 3½ inches in diameter and is typically 2 to 3 inches deep.

U.S. Pat. No. 4,344,303 to Kelly, Jr. teaches a beverage container cooler with a flexible foam insulation layer, which also has cooling fluid contained within the cavities. A beverage container slides into the Kelly article an is insulated, as well as further cooled by the cooling fluid contained within the insulation. Kelly does not disclose the insulating article having a narrow lower end to fit within a standard cup holder, as does the present invention.

U.S. Pat. No. 3,765,559 to Sauey et al. teaches a slush cone assembly formed of an insulatory jacket adapted to retain a refrigerant gel. The Sauey article has a tapering, narrowing lower end, however, Sauey does not teach if this narrowing would fit into a standard cup holder. Further, Sauey also does not teach the use of the slush cone insulating article within standard cup holders.

U.S. Pat. No. 4,989,418 to Hewlett teaches a cooling wrap for a beverage container. The wrap includes interlocking ends which, when engaged, keep the wrap securely upon the beverage container. Hewlett does not teach the use of insulatory wrap upon beverage containers within standard cup holders. Furthermore, it does not appear that the Hewlett article would leave uncovered a sufficient lower portion of the beverage container to allow the beverage container to be slidably secured within a standard cup holder.

There are other beverage containers which exist that have a tapered or narrowed lower end specifically to fit within standard cup holders, specifically in automotive cup holders; however, these containers actually contain the beverage, and such containers also lack insulation to prevent warming of the contained beverage. As such, none of the above, or other references known to the inventor address the problem solved by the present invention. That is, providing a beverage container cooler which is specifically adapted to be slidably secured in a standard cup holder.

SUMMARY OF THE INVENTION

The present invention is a beverage container cooler proportioned for use with a standard cup holder. The cooler particularly comprises a rigid tube with an interior proportioned to accommodate a beverage container, and an exterior diameter proportioned to fit within a standard automotive cup holder. Insulation is provided about the exterior the upper unheld end of the tube.

It is accordingly an object of the instant invention to provide a beverage container cooler adapted to fit into a standard cup holder.

It is another object to provide a beverage container cooler which is securable into an automotive cup holder.

It is a further object of the invention to provide an article which addresses the above problems and is economical to manufacture and market.

The above and yet other objects and advantages of the present invention will become apparent from the hereinafter set forth Brief Description of the Drawings, Detailed Description of the Invention and Claims appended herewith.

BRIEF DESCRIPTION OF THE DRAWINGS

FIG. 1 is a perspective view of the beverage container cooler.

FIG. 2 is a perspective view of the beverage container cooler with a beverage can inserted therein.

FIG. 3 is an axial side cross-sectional view of the beverage container cooler.

FIG. 4 is an axial side cross-section of a one-piece embodiment of the beverage container cooler.

FIG. 5 is a perspective view and cross-section of insulation for the cooler with pockets of a freezable liquid.

DETAILED DESCRIPTION OF THE INVENTION

The beverage container cooler, as shown in FIG. 1, includes a rigid tube 10, which has an open end 12, a hollow 22, a closed lower end 14, and an insulation 16 about the exterior of the upper end 12. The upper edge 18 of the insulation 16 is flush with the upper end 12 of the rigid tube 10. The lower edge 20 of the insulation 16 does not cover the entire lower end 14 of the rigid tube 10, which thereby allows the lower end 14 of the rigid tube 10 to fit within a standard cup holder.

The standard cup holder, such as is present in automobiles and boats, does not typically accommodate a beverage container with a diameter of more than 4 inches and, thus, the diameter of the rigid tube 10 should not exceed 4 inches. The optimum diameter of the rigid tube 10 should be about 3 inches. This allows the lower end 14 of the beverage container cooler to fit within a standard cup holder yet be large enough to prevent any rattling and secure the cooler within the cup holder.

As illustrated in FIG. 2, the length of the rigid tube 10 should be al least 5½ inches in length to embrace the body of a typical aluminum can container 24 and still allow the upper end of the aluminum can 24 to be raised over the upper end 12 of the rigid tube 10 and upper end 18 of the insulation 16. This allows one to properly one's mouth in a liquid-tight seal over the opening 25 in the aluminum can 24.

Thus, as is shown in the cross-sectional view of FIG. 3, the ideal length 19 of the rigid tube 10 and, thus, the beverage container cooler is 6¼ inches. The lower end 14 of the rigid tube 10 has located at its center a small opening 26, seen in FIG. 3, which allows condensation on the beverage container and any liquid spilled into the rigid tube 10 to drain.

As further illustrated in FIG. 3, the length 17 of the insulation 16 extends from the top of the upper end 12 of the rigid tube 10 and is 3½ inches. Therefore, a length 15 of the uninsulated lower end 14 of the rigid tube 10 ideally is 2¾ inches. This allows the lower end 14 of the rigid tube 10 to fit within a standard cup holder sufficiently to secure the beverage container cooler, while the insulation 16 rests upon the cup holder, and is thereby too large in diameter to fit within the cup holder.

The rigid tube 10 is preferably made from a thermoplastic, which is shaped into a tube through injection molding. Such thermoplastics as polyvinylchloride (PVC) and polyethylene are suitable for such usage. The rigid tube 10 may also be made from any thermoplastic which is heat-moldable into a tube.

The insulation 16 is preferably made from a plastic foam which can be separately molded as an individual tube which is then slid over the upper end 12 of the rigid tube 10. Either an adhesive or heat may be used to bind the insulation to the rigid tube 10. The plastic foam insulation 16 may also be sprayed in liquid form upon the upper end 12 of the rigid tube 10 and then dry-cured into insulation 16 which is firmly attached to the rigid tube 10. The insulation may also be made from other insulative materials such as styrofoam.

The beverage container cooler may also be embodied in a one piece, semi-rigid form, as shown in cross-section in FIG. 4. The one-piece embodiment is made from a semi-rigid tube 28, having an upper end 32 with a hollow portion 30, and a lower end 34 which has a diameter 35 approximating the diameter of the hollow portion 30 included within the upper end 32.

The upper end 32 is slightly longer than the length of the rigid tube embodiment in that the hollow portion 30 of the upper end 32 of single piece embodiment is 6¼ inches long to accommodate a standard aluminum beverage container. The lower end 34 may be the same 2¾ inches in length as the lower end of the rigid tube embodiment. However, the length 37 of the lower end 34 of the single piece embodiment may extend further, about an additional ½ to ¾ of an inch, to allow the one piece cooler to be securably nest within the standard cup holder. This is because the larger upper end 32 changes the center of gravity of the beverage container cooler and therefore it can tip from the cup holder more easily if not enough of the lower end is braced within the cup holder. The lower end 34 also has a drainage hole 36 similar in location and purpose to the drainage hole of the rigid tube embodiment.

The single one piece embodiment may be constructed from a semi-rigid plastic foam which is either injection-molded or thermally molded into the instant bi-diametric tube. It may also be made from a thin layer of hollow rigid plastic, giving it a semi-rigid construction, as well as insulative properties.

The insulation 16 of the rigid tube embodiment, as shown in FIG. 5, may also contain pockets 40 of freezable cooling fluid. The pockets 38 are longitudinal and parallel to the length of the insulation 16. Thus, the beverage container cooler can be placed in a freezer or refrigerator prior to use so that the fluid in the pockets 40 will freeze, cooling the beverage container as well as insulating it. This embodiment therefore will keep a beverage container cooler for a longer period of time than that of only the insulatory beverage container cooler.

Accordingly, while there has been shown and described the preferred and alternate embodiments of the present invention, it is to be understood that the invention may be embodied otherwise than is specifically shown and described herein, and that within said embodiments, certain changes in the forms and arrangement of parts may be made without departing from the underlying ideas and principles of this invention as set forth in the Claims appended herewith.

Having thus set forth my invention, what I claim as new, useful, non-obvious and, accordingly, secure by Letters Patent of the United States is:

1. A temperature maintenance device for a beverage container, the device comprising:

(a) a rigid longitudinal tube having a circumferential interior thereby defining a tubular interior wall and exterior thereof, said tube including an open ended upper region and an extended lower region having a closed end thereof thereby defining a planar bottom end wall said tube having a constant interior diameter, thereby dimentioned and configured so as to receive a standard beverage can in close conformity to said bottom end wall, and in close conformity to said interior wall along substantially the entire length of said beverage can; and (b) thermal insulating means provided upon said exterior of said upper portion of said rigid tube, a lower concentric surface of said insulating means located near an interface between said upper and lower regions, whereby said lower region of said tube and said lower concentric surface of said insulating means, in combination constitute means for complemental engagement with a beverage container holder.

2. The device as recited in claim 1 further comprising:

means for bonding said insulating means to said exterior of said upper portion thereof.

3. The device as recited in claim 1, in which said insulating means comprises:

a sleeve proportioned for slip fittable securement about said exterior of said upper portion of said tube.

4. The device as recited in claim 1, in which said closed end of said lower portion includes a substantially axially oriented drainage channel.

5. The device as recited in claim 1, in which said insulating means comprises a selectaby freezable cooling fluid.

* * * * *